(12) United States Patent
Suzuki

(10) Patent No.: US 6,493,540 B1
(45) Date of Patent: Dec. 10, 2002

(54) RADIO RANDOM ACCESS CONTROL SYSTEM IN MOBILE RADIO COMMUNICATION SYSTEM

(75) Inventor: Isao Suzuki, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/456,072

(22) Filed: Dec. 6, 1999

(30) Foreign Application Priority Data

Dec. 7, 1998  (JP) ............................................. 10-347548

(51) Int. Cl.[7] ................................................ H04Q 7/20
(52) U.S. Cl. ...................................... 455/67.1; 455/423
(58) Field of Search .............................. 455/403, 405, 455/407, 423, 425, 17, 18, 24, 501, 502, 503, 504, 512, 513, 63, 67.1, 67.3, 72, 466, 452; 370/434, 470, 472, 448, 508, 509, 510, 519, 521, 533, 535; 709/238

(56) References Cited

U.S. PATENT DOCUMENTS

| | | | | |
|---|---|---|---|---|
| 4,707,829 A | * | 11/1987 | Pendse ........................ 340/2.7 |
| 4,727,592 A | * | 2/1988 | Okada et al. ................ 359/119 |
| 5,706,281 A | * | 1/1998 | Hashimoto et al. .......... 370/252 |
| 5,822,538 A | * | 10/1998 | Krishna et al. .............. 370/447 |
| 5,854,900 A | * | 12/1998 | Kalkunte et al. ............ 370/448 |
| 5,875,402 A | * | 2/1999 | Yamawaki .................... 370/350 |
| 5,982,778 A | * | 11/1999 | Mangin et al. .............. 370/252 |
| 6,078,572 A | * | 6/2000 | Tanno et al. ................. 370/335 |
| 6,230,195 B1 | * | 5/2001 | Sugawara et al. ........... 709/220 |
| 6,266,360 B1 | * | 7/2001 | Okamoto ..................... 370/347 |
| 6,337,850 B1 | * | 1/2002 | Nakano et al. .............. 370/230 |

* cited by examiner

*Primary Examiner*—Nay Maung
*Assistant Examiner*—Jean A Gelin
(74) *Attorney, Agent, or Firm*—Sughrue Mion, PLLC

(57) ABSTRACT

A mobile radio communication system in which each of a plurality of mobile stations and a base station randomly transmits and receives data to and from each other is disclosed. A radio random access control system in which each mobile station receives all data from the base station, executes an analysis of destination mobile stations of the received data, obtains from the analysis result the number of mobile stations currently transmitting or receiving the data to or from the base station in a radio zone, in which the own station is present, and calculates delay time after a transmission timing collision at the time of the start of transmission of the own mobile station till the next start of transmission according to the obtained number of mobile stations excluding the own station.

8 Claims, 9 Drawing Sheets

PHYSICAL CHANNEL DOWN-SIGNAL FORMAT FOR PACKET (SEE RCR STD-27)

RADIO RANDOM ACCESS CONTROL SYSTEM IN MOBILE RADIO COMMUNICATION SYSTEM

BACKGROUND OF THE INVENTION

The present invention relates to communication random access control system at the time of collision of transmission start timings in a mobile radio system and, more particularly, a radio random access control system (method and apparatus) for suppressing non-transmission time interval as much as possible by improving the random delay in the mobile station.

In the prior art communication random access control system, upon collision of the transmission start timings of two or more mobile stations as a result of random transmission of a plurality of mobile stations to the base station, a random delay is generated in a mobile station with no transmission start timing allotted thereto, and the transmission start timings are controlled such that the transmission start timings of the mobile stations, which previously encountered the transmission start timing collision, will not collide again. However, since the random generation is generated in a simple method, unnecessarily long non-transmission or vacant time intervals are generated to deteriorate the data transmission rate in radio time interval.

FIG. 8 is a view showing the status of collision of the transmission start timings of two mobile stations in the prior art. FIG. 9 is a view showing the status of collision of the transmission start timings of three mobile stations in the prior art.

FIG. 8 illustrates operation in the prior art system in case when a collision occurs at transmission start timings of two mobile stations. In the Figure, a time axis extends from left to right. Each slot includes collision control bits (E, for instance I, N and PE=0). Mobile stations #1 and #2 receiving a signal from a base station analyze collision control bits (E) transmitted therefrom, and checks whether the base station is in an idle (I) or a busy (B) state. In the case of FIG. 8, the first slot #0 from the left end indicates that the base station is in the idle state. Thus, the mobile stations #1 and #2 start the transmission of data to the base station in the same way.

When the base station could receive mobile station data at the timing of the next slot #0, it sets a "received" (R) bit in the collision control bits. When the base station could not receive any data, it sets a "not received" (N) bit in the collision control bits.

In the case of FIG. 8, however, the two mobile stations simultaneously transmit the at the same timing of the same frequency. Therefore, the base station can not receive the two data from the mobile stations #1 and #2 due to the radio wave interference, and consequently sets the "not received" (N) bit in the collision control bits (E).

Receiving the "not received" bit in the collision control bits set by the base station, the mobile stations #1 and #2 delay the operation of data transmission to the base station by generating random numbers within a maximum fixed number of 500 ms and setting delay times corresponding to the generated random numbers. (This operation is referred to as random delay operation.) In the case of FIG. 8, it is assumed that the random delay time set by the mobile station #1 is shorter and about 20 ms. Thus, checking the collision control bits in the third slot #0 from the left and finding that the base station is in the idle (I) state, the mobile station #1 starts transmission. In the subsequent fourth slot #0 from the left end, the mobile station #1 receives the signal other than "0" as bits "R" and "PE" (set as the same data as the CRC result of the transmitted data) indicating that the transmitted data has been received in the base station side. This means that the mobile station #1 succeeded in the transmission. Since the data transmitted from the mobile station #1 has such a length that its transmission can be completed in one slot, terms "FIRST" and "LAST" are used in the Figure.

It is also assumed that the random delay time set by the mobile station #2 is 55 ms. The mobile station #2 thus can receive the collision control bits in the fourth slot #2 from the left end right after this delay time. Since the base station is found to be capable of receiving the data at this time, the mobile station #2 starts the transmission. In the fifth slot #2 from the left end bits "R" and "PE 0" indicative of normal reception of the data transmitted from the mobile station #2 has been set. In addition, the data transmitted from the mobile station #2 covers three slots, and also it has been made clear that the mobile station #2 will continue transmission at the next slot timing. Thus, bit "B" indicative of the busy state has been set.

It will be seen from the operation shown in FIG. 8 that no "non-transmission interval" is generated even when the data from two mobile stations collide with each other. In FIG. 8, the "non-transmission interval" is shown to be shorter for the sake of the scale.

FIG. 9, like FIG. 8, illustrates the prior art system operation. This case, however, concerns with a collision of data transmitted from three mobile stations, and the mobile stations #1 to #3 set random delay times of about 86, about 40 and about 60 ms, respectively, by generating random numbers. Like the case of FIG. 8, no "non-transmission interval" is generated.

SUMMARY OF THE INVENTION

In view of the above background, it is an object of the present invention to provide a radio random access control method capable of improving the random delay in the mobile station to suppress the non-transmission time interval for effective utilization of the radio time interval.

According to an aspect of the present invention, there is provided in a mobile radio communication system in which each of a plurality of mobile stations and a base station randomly transmits and receives data to and from each other, a radio random access control system in which each mobile station receives all data from the base station, executes an analysis of destination mobile stations of the received data, obtains from the analysis result the number of mobile stations currently transmitting or receiving the data to or from the base station in a radio zone, in which the own station is present, and calculates delay time after a transmission timing collision at the time of the start of transmission of the own mobile station till the next start of transmission according to the obtained number of mobile stations excluding the own station.

The maximum value of the calculated delay time is time obtained by multiplying the number of mobile stations with data transmitted thereto by a unit time.

According to another aspect of the present invention, there is provided in a mobile radio communication system in which each of a plurality of mobile stations and a base station can randomly transmit and receive data to and from each other, a radio random access control system, wherein each mobile station comprises a transmitting/receiving antenna, a transmitting circuit for transmitting radio signals to the base station, a modulating circuit, a receiving circuit for receiving radio communication data from the base station, a demodulating circuit for converting the received data to binary data, and a controller for executing a de-scrambling analysis of the binary data thus obtained to binary data, and executing an analysis of destinations included the data transmitted from the base station, detecting the number of destination mobile stations of data received in a certain fixed time interval and calculating the delay time after a transmission timing collision at the time of the start of transmission from the own station till the next start of transmission according to the detected number of mobile stations exclusive of the own station.

The controller includes a signal decoding unit for executing a de-scrambling analysis of the obtained binary data to binary data, a destination judging unit for analyzing destinations contained in the data received from the base station, and a CPU for detecting the number of destination mobile stations contained in the data received in a predetermined time interval, estimating the number of mobile stations in communication with the base station and calculating delay time after the transmission timing collision at the time of the start of transmission till the next start of transmission according to the detected mobile station number.

The controller includes a transmission control unit for executing a check, when data to be transmitted is generated, as to whether the base station is above to receive data and causing data transmission to the base station at a prescribed timing when the base station is above to receive data, a signal coding unit for executing a scrambling process on data to be transmitted from the CPU to the base station in predetermined scrambling codes recognized on the base station side, a signal decoding unit for executing a de-scrambling process on received signal from the base station in predetermined scrambling codes and transmitting the result to the CPU and a destination judging unit, the destination judging unit for judging whether identifier data defined in the data obtained by the de-scrambling process in the signal decoding represents the own station or any other station or is a vacant signal and informing the CPU of the judgment result, and a CPU for estimating the number of mobile stations currently transmitting or receiving data to or from the base station on the basis of data from the destination judging unit and calculating the optimum random delay time from the estimated mobile station number upon collision of the transmission start timing with that of other station at the time of the start of transmission, the transmission control unit being controlled for data transmission to the base station after the lapse of the calculated random delay time.

According to other aspect of the present invention, there is provided a radio random access control system in a mobile radio communication system in which each of a plurality of mobile stations and a base station randomly transmits and receives data to and from each other, wherein the mobile station determines the number of mobile stations currently transmitting or receiving the data to or from the base station in a radio zone, in which the own station is present, on the basis of the received data from the base station and calculates delay time after a transmission timing collision at the time of the start of transmission of the own mobile station till the next start of transmission according to the obtained number of mobile stations excluding the own station.

The mobile station executes an analysis of destination mobile stations of the received data to obtain the number of mobile stations currently transmitting or receiving the data to or from the base station in a radio zone, in which the own station is present.

The maximum value of the calculated delay time is time obtained by multiplying the number of mobile stations with data transmitted thereto by a unit time.

Other objects and features will be clarified from the following description with reference to attached drawings.

PREFERRED EMBODIMENTS OF THE INVENTION

Preferred embodiments of the present invention will now be described with reference to the drawings.

Figure 1:
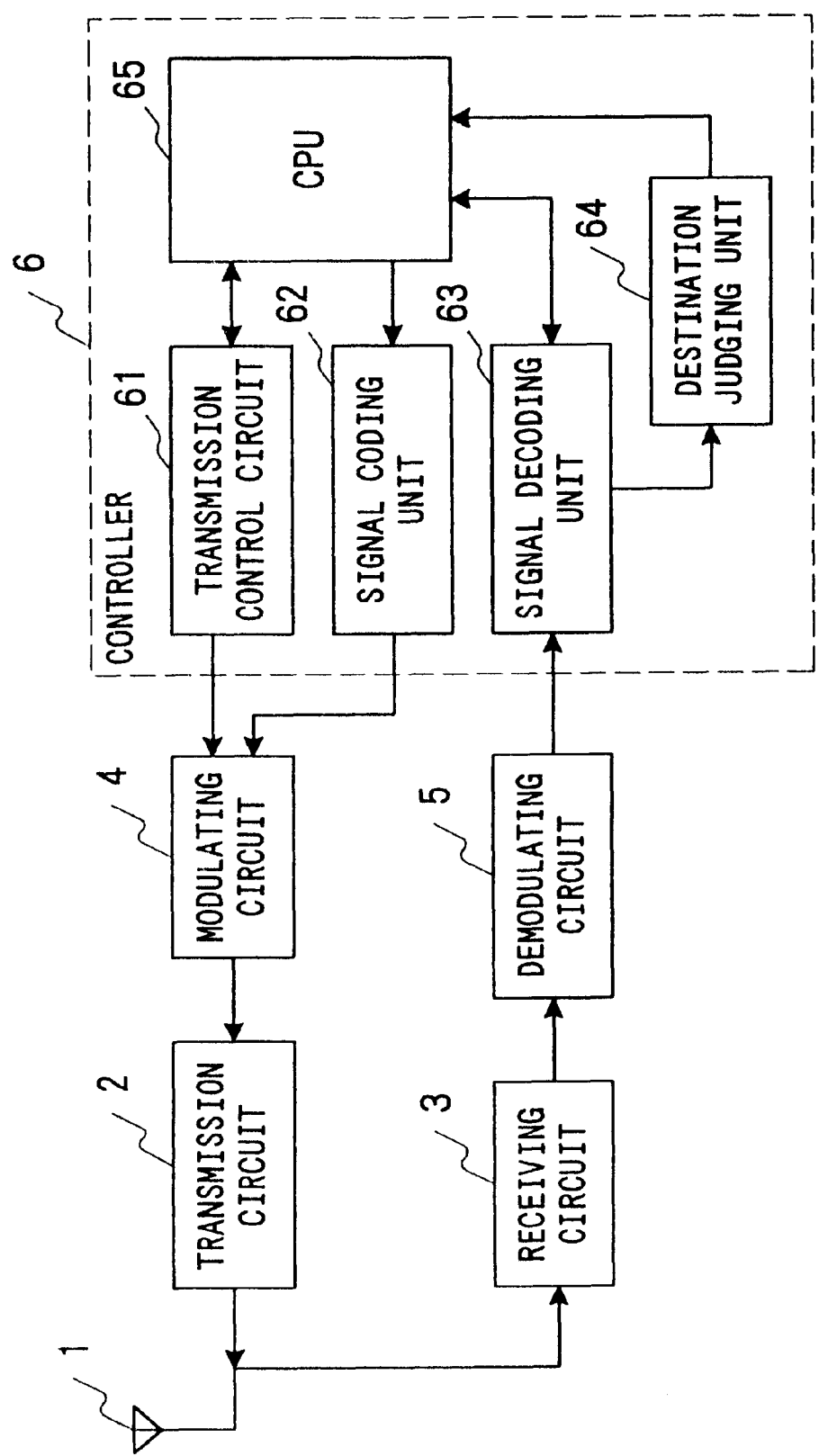
FIG. 1 shows a block diagram of a mobile station according to an embodiment of the present invention.

Referring to FIG. 1, a mobile station in this embodiment comprises a transmitting/receiving antenna for transmission and reception of data to and from a base station (not shown), a transmitting circuit 2 for transmitting radio signal to the base station, a modulating circuit 4 for converting a binary signal at either level "1" or "0" to a signal capable of being transmitted, a receiving circuit 3 for receiving a transmitted signal from the base station, a demodulating signal 5 for converting the signal received by the receiving circuit 3 to a binary signal at either level "1" or "0", and a controller 6 for controlling the above components.

The controller 6 includes a transmission control unit 61, a signal coding unit 62, a signal decoding unit 63, a destination judging unit 64 and a CPU 65.

Radio communication data transmitted from a base station (not shown) is received in the receiving circuit 3 and converted in the demodulating circuit 5 to the binary data. The signal decoding unit 63 in the controller 6 executes de-scrambling analysis on the binary data thus obtained. The destination judging unit 64 executes the analysis of destination of data transmitted from the base station. The CPU 6 detects the number of mobile station as represented by destination data in the data received in a certain fixed time interval, and estimates the number of mobile stations currently in communication with the base station. On the basis of the estimated mobile station number, a delay time after timing collusion at the instant of start of transmission till the next start of transmission is calculated, thus permitting an optimum timing of transmission to be obtained.

When transmission data is generated on the side of the own station (mobile station), the transmission control unit 61 checks whether the base station is able to receive data. When the base station is able to receive data, data transmission to the base station is started at a prescribed timing. The signal coding unit 62 executes a scrambling process on the data to be transmitted from the CPU 65 to the base station in scrambling codes which are predetermined with the base station side. The signal decoding unit 63, on the other hand, executes a de-scrambling process on signal from the base station in predetermined scrambling codes, and transmits the result to the CPU 65 and also to the destination judging unit 64.

The destination judging unit 64 judges whether mobile station identifier data defined in the data obtained through the de-scrambling process in the signal decoding unit 63 represents the own station or any other station or is vacant data. On the basis of the data from the destination judging unit 64, the CPU 65 estimates the number of mobile stations currently transmitting or receiving the data to or from the base station. When the transmission start timing collides with that of any other mobile station at the time of the transmission start, an optimum random delay time is calculated from the estimated mobile station number (as will be described later), and after the lapse of the random delay time the transmission control unit 61 is controlled to transmit data to the base station.

The operation of this embodiment will now be descried with reference to the drawings.

Figure 2:
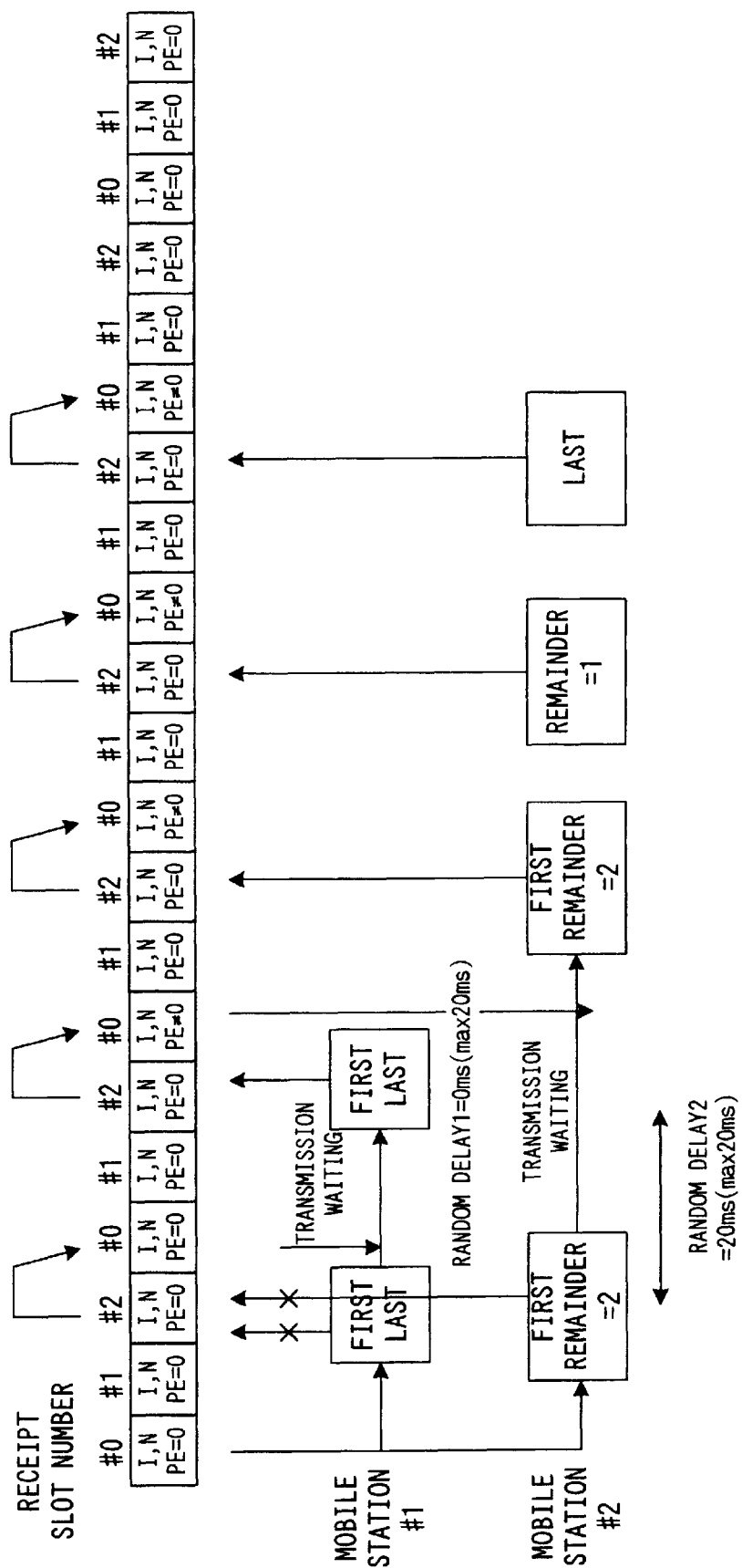
FIG. 2 is a view illustrating the status when the transmission start timings of two mobile stations collide with each other.
Figure 3:
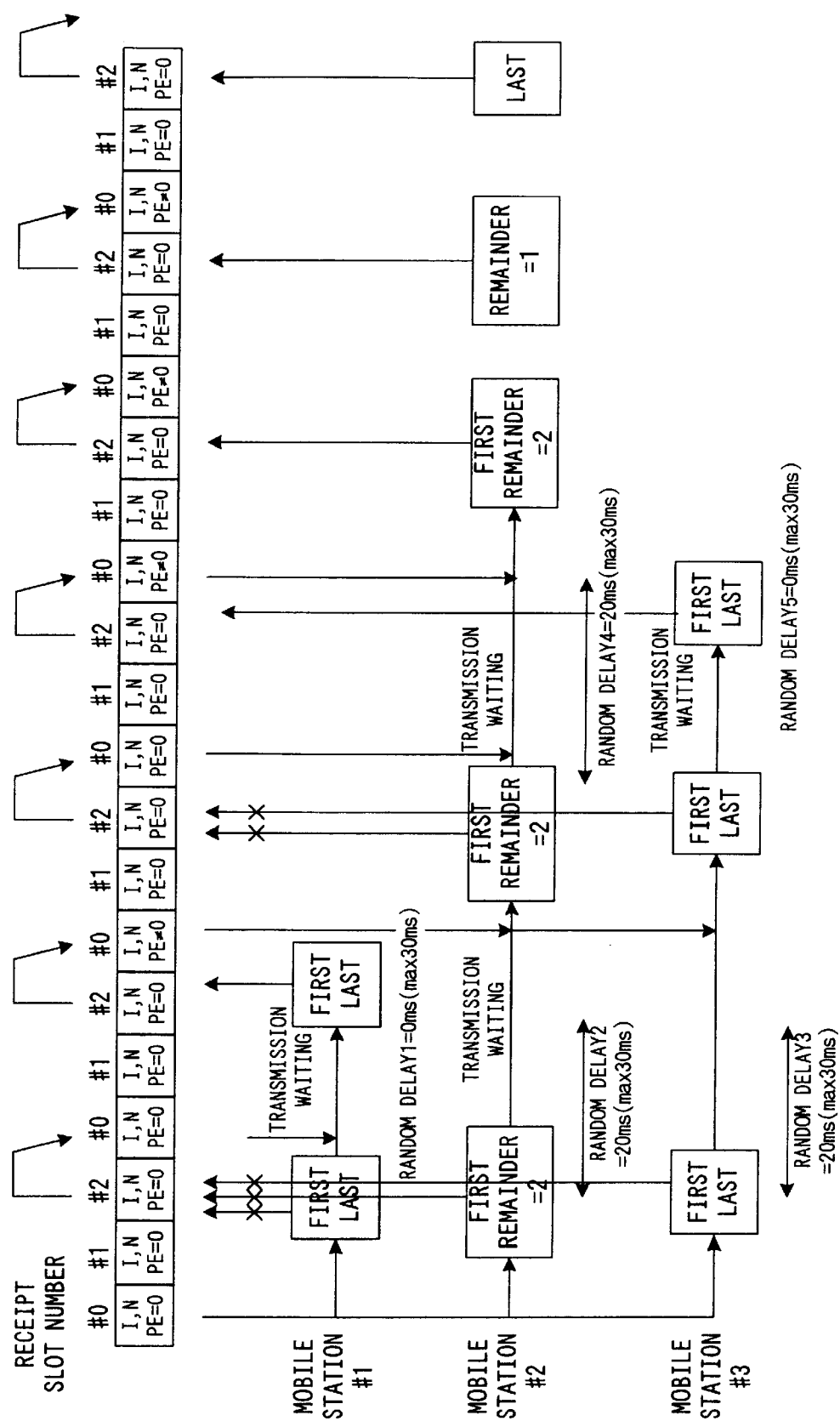
FIG. 3 is a view illustrating the status when the transmission start timings of three mobile stations collide with one another.

FIG. 2 is a view illustrating the status when the transmission start timings of two mobile stations collide with each other. FIG. 3 is a view illustrating the status when the transmission start timings of three mobile stations collide with one another.

The embodiment uses packet communication physical channels of TDMA (time division multiple access) system, and it will be described in connection with a case of using a vacant line control random access system with partial echo (ICMA-PE).

A mobile station in this embodiment has no intelligence about what timing user data destined to the own station is transmitted at and what sub-frame the data is transmitted in. Therefore, the base station should receive all the sub-frames transmitted from the base station. This means that the receiving circuit 3 in the mobile station should be receiving the data at all times. The radio signal from the base station is received by the transmitting/receiving antenna.

Figure 7A:
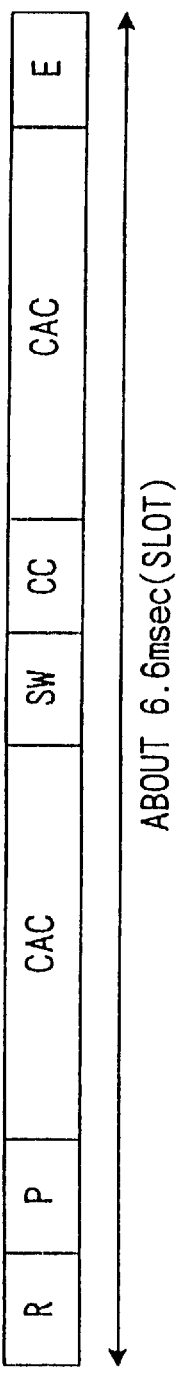
FIGS. 7(A) and 7(B) show a physical channel down-signal format for a packet and a configuration of collision control bits.
Figure 7B:
Figure 7B:
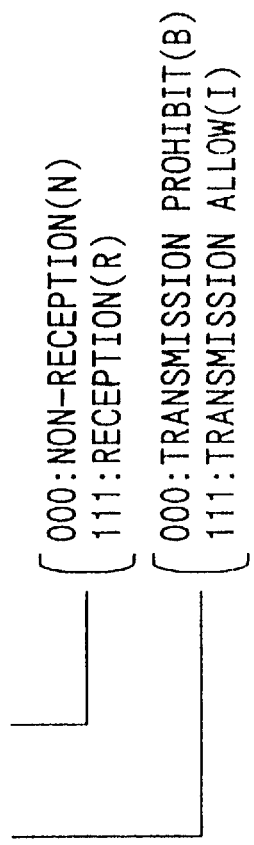

FIG. 7(A) shows a physical channel down-signal format for a packet, that is, signal format of each slot shown in FIG. 2, and FIG. 7(B) shows a configuration of collision control bits (E).

In the Figure, "R" indicates a burst transient response guard time, "P" indicates a preamble for establishing bit synchronization in a radio time interval, "CC" indicates a control signal, "SW" indicates a synchronization word for establishing inter-radio time interval frame operation, "CAC" indicates a color code for providing a confidential property of signal, and "E" indicates collision control bits representing the state of the base station concerning the reception.

In the vacant line random access system with partial echo, the base station informs each mobile station of its receiving state by informing transmission allowed/prohibited (R/N bits), signal being reception/non-reception (RIN bits) and partial echo (PE bits) in the next slot with collision control bits in its down-signal format (i.e., "E" in the physical channel down-signal format for a packet, see FIG. 7(B)). These operations are prescribed in standards, and only require making use of standard operations of the base station in "portable telephone" in actual service. That is, no specific means need be provided on the base station side.

As shown in FIG. 7(B), the collision control bits are 22 in total number. This data is transmitted from the base station for each slot, and it is constituted by 3 I/B bits, 3 R/NM bits and 16 PE bits. The I/B bits represent transmission prohibited (B) when it is "000", and represent transmission allowed (I) when it is "111". With the I/B bits the mobile station is informed of whether the base station is able to receive the data. The R/N bits represent non-reception (N) when they are "000", and represent reception (R) when they are "111". In order to clarify the mobile station, the data from which is received on the base station side, the PE bits in the E bits are transmitted from the base station to each mobile station by setting 16-bit CRC (Cyclic Redundancy Check) computation result in mobile station up-signal in the slot received in the base station as the E bits.

The mobile station can make a check from the R/N and PE bits in the next collision control bits in the same slot as to whether the data transmitted with the transmission allowed (I) of the I/B bits could be received on the base station side.

For analyzing the collision control bits, radio signal from the base station through the transmitting/receiving antenna 1 is received in the receiving circuit 3 and converted in the demodulating circuit 5 to binary signal at either level "1" or "0". Since the binary signal thus obtained is coded, the signal decoding circuit 63 de-scrambles the signal with scrambling codes specified from the CPU 65, and delivers the signal obtained after the de-scrambling to the destination judging unit 64 and the CPU 65.

The destination judging unit 64 analyze s the identifier data, and delivers the result to the CPU 65. The CPU 65 makes a judgment as to whether it is possible to start the data transmission to the base station by extracting the collision control bits from the signal after the de-scrambling.

FIG. 2 illustrates operation according to the invention in case where a collision occurs at transmission start timings of two mobile stations. In the Figure, a time axis extends from left to right. Each slot includes collision control bits (E, for instance I, N and PE=0). Mobile stations #1 and #2 receiving signal from a base station analyze collision control bits (E) transmitted therefrom, and checks whether the base station is in an idle (I) or a busy (B) state. In the case of FIG. 2, the first slot #0 from the left end indicates that the base station is in the idle state. Thus, the mobile stations #1 and #2 start transmission of data to the base station in the same way.

When the base station could receive mobile station data at the timing of the next slot #0, it sets a "received" (R) bit in the collision control bits. When the base station could not receive any data, it sets a "not received" (N) bit in the collision control bits.

In the case of FIG. 2, the two mobile stations transmit data at the same timing of the same frequency. Therefore, the base station can not receive the two data transmitted from the mobile stations #1 and #2 due to radio wave interference, and thus sets "not received" (N) bit in the collision control bits (E).

Figure 6:
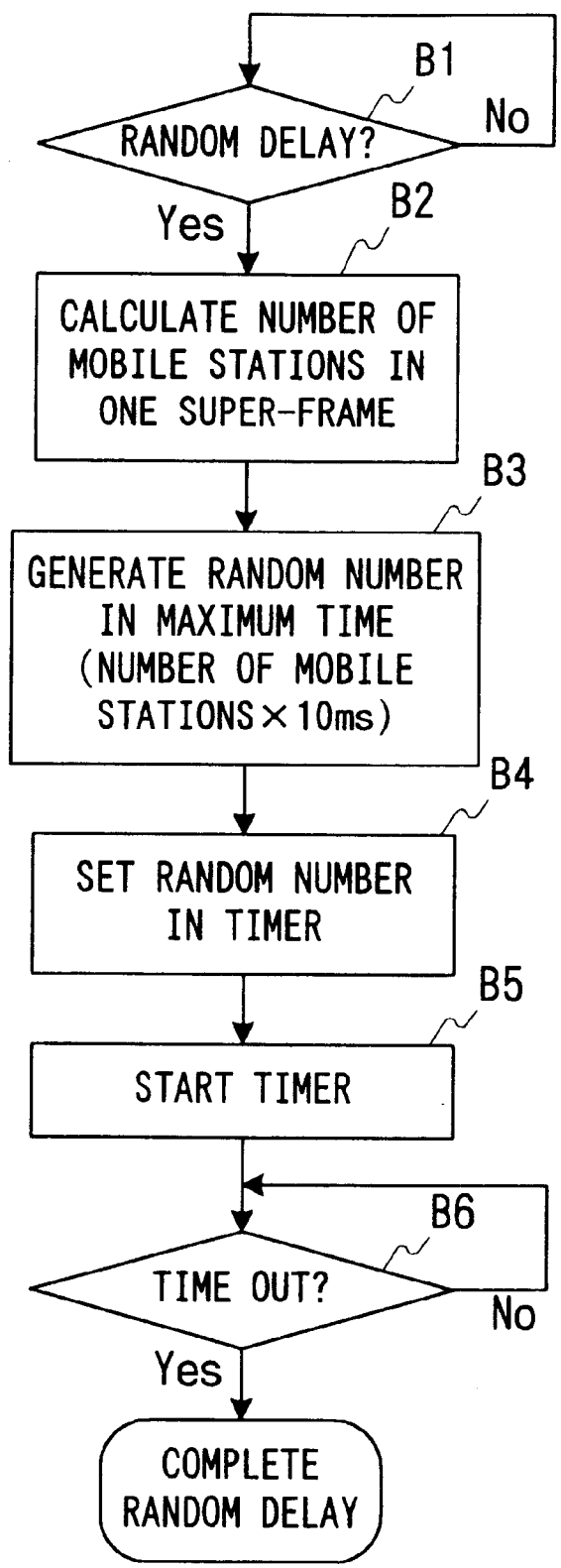
FIG. 6 is a flow chart illustrating the procedure of calculating the random delay time.

When receiving a "not received" collision control bit set by the base station, the mobile stations #1 and #2 delay the operation of transmission of data to the base station by calculating delay times in a manner as shown in FIG. 6 to avoid further collision of data transmitted from them.

In the case of FIG. 2, the mobile station #2 generates random number value of about 0 ms, and it checks the collision control bits in the second slot #0 from the left end. Since the base station is found to be in the idle (I) state, the mobile station #1 starts transmission, and in the third slot #0 from the left end it receives signal other than "0" as bits "R"

and "PE" (set as the same data as the CRC result of the transmitted data) indicating that the transmitted data has been received on the base station side. This means that the mobile station #1 succeeded in the transmission. Since the data transmitted from the mobile station #1 has such a length that its transmission can be completed in one slot, terms "FIRST" and "LAST" are used in the Figure.

The mobile station #2 generates a random number value of 20 ms. Right after this delay time, i.e., at the timing of the third slot #2, the mobile station #2 can receive the collision control bits. Since the base station is found to be capable of receiving data at this time, the mobile station #2 starts transmission. In the fourth slot #0 from the left end, bits "R" and "PE ≠0" indicative of normal reception of the data transmitted from the mobile station #2 has been set. In addition, the data transmitted form the mobile station #2 covers three slots, and it has been made clear that the mobile station #2 will continue transmission at the next slot timing. Thus, bit "B" indicative of the busy state has been set.

It will be seen from the operation example shown in FIG. 2 that no "non-transmission interval" is generated even in the case of a collision of data from two mobile stations.

FIG. 3, like FIG. 2, illustrates operation according to the invention. This case concerns a collision of data transmitted from three mobile stations at the same transmission start timing, and the mobile stations #1 to #3 set random delay times of 0, 20 and 20 ms, respectively, by generating random numbers. Checking the collision control bits of the second slot #0 from the left end, the mobile station #1 finds that the base station is in the idle (I) state, and thus starts transmission. Then in the third slot #0 from the left end, the mobile station #1 receives signal other than "0" as bits "R" and "PE" (set as the same data as the CRC result of the transmitted data) indicating that the transmitted data has been received on the base station side, thus confirming that it has succeeded in the transmission. Data transmitted from the mobile stations #2 and #3 at the same timing after the random delay time lapse collide with each other, and the mobile stations #2 and #3 thus generate further random delay times.

Specifically, the mobile stations #2 and #3 this time generate random delay times of 20 and 0 ms, respectively. Thus, checking the collision control bits in the fourth slot #0 from the left end, the mobile station #3 finds that the base station is in the idle (I) state, and thus starts transmission. Then in the fifth slot #0 from the left end, the mobile station #2 receives signal other than "0" as bits "R" and "PE" (set as the same data as the CRC result of the transmitted data) indicating that the first slot of the transmitted data has been received on the base station side, thus confirming that it has succeeded in the transmission.

The mobile station #2 checking the collision control bits in the fifth slot #0 from the left end finds that the base station is in the idle (I) state, and thus starts transmission. Then in the sixth slot #0 from the left end the mobile station #2 receives signal other than "0" as bits "R" and "PE" (set as the same data as the CRC result of the transmitted data) indicating that the transmitted data has been received on the base station side, thus confirming that it has succeeded in the transmission of the first slot.

It will be seen from the operation example shown in FIG. 3 that no "non-transmission interval" is generated even in the case of a collision of data from three mobile stations.

Figure 4:
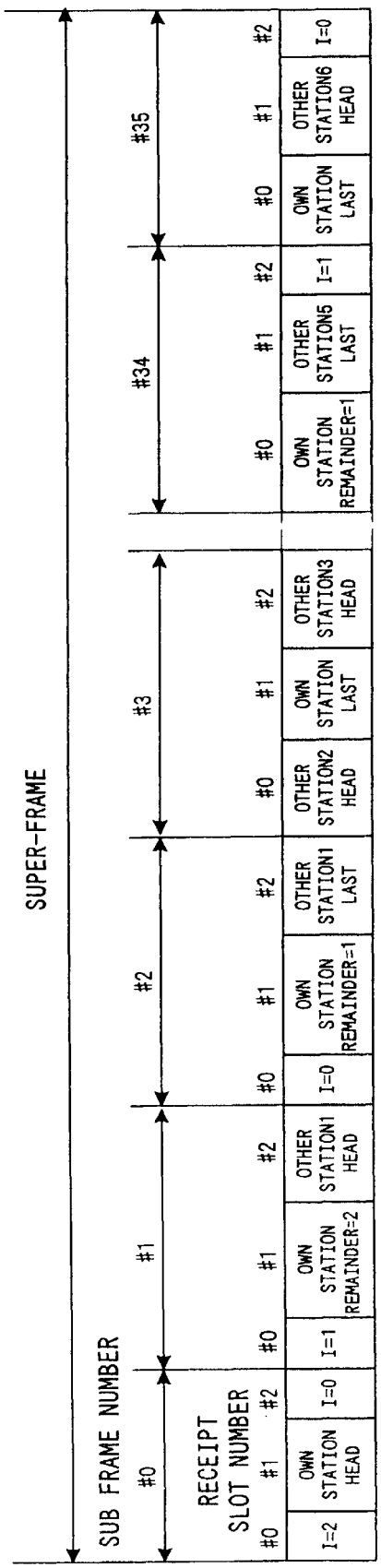
FIG. 4 shows a super frame in the embodiment.

FIG. 4 shows the arrangement of signals in a super-frame recurring at a certain frequency, the signals being transmitted from a base station to a plurality of mobile stations. The block indicated by "OWN STATION" and "FIRST" is the first slot of signal transmitted to a certain mobile station. This signal is continued up to slot #1 in sub-frame #3. The block indicated by "OTHER STATION 1" and "FIRST" is the first slot of signal transmitted to a different mobile station. This signal is continued up to slot #2 in sub-frame #2. It is thus shown that signals transmitted to the own station and 6 other stations are present in the super-frame.

Figure 5:
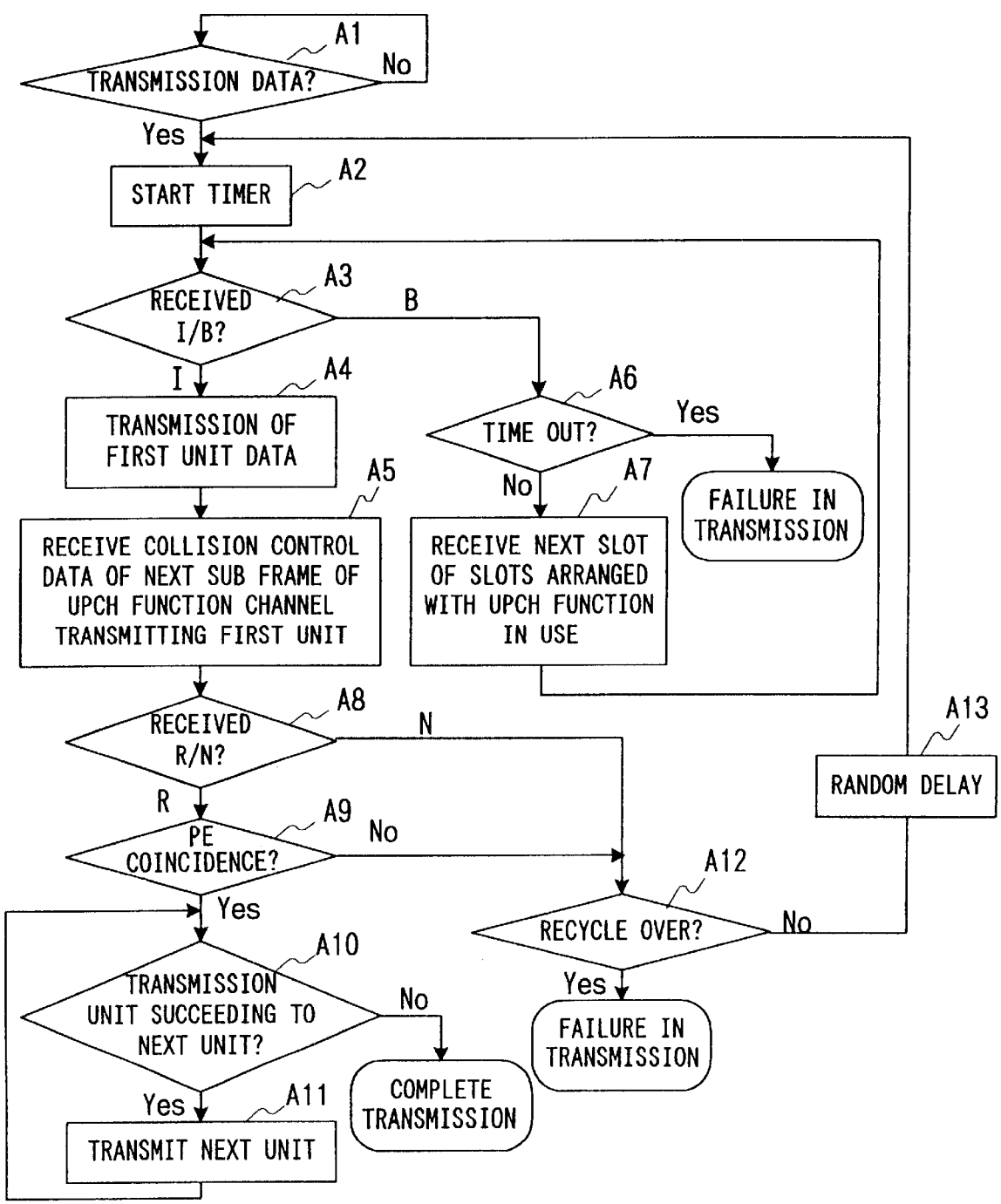
FIG. 5 is a flow chart illustrating the routine executed in the embodiment of the present invention.

The operation of the embodiment will now be described with reference to the drawings. FIG. 5 is a flow chart illustrating the routine executed in the embodiment of the present invention.

As shown in FIG. 5, the mobile station judges whether the data for transmission to the base station is present (step A1). When the transmission data is generated, a timer for taking the timing, at which it is possible to start transmission of the transmission data, is started (step A2). Judgment with the I/B bits is also executed from the collision control bits received in the mobile station as to whether it is allowed to start transmission in the next slot (step A3). In the case of the transmission allowed (I), the transmission of first unit data is started at the timing of the next transmission slot (step A4). To make judgment with the R/N and PE bits of the collision control data as to whether the first unit data could be received in the base station, the next collision control bits are received (step A5). When the R/N bits of the received collision control data represent reception (R) (step A8), it is checked whether the received PE bits are coincident with the CRC computation result obtained from the data transmitted in the first unit (step A9). When the PE bits are coincident with the CRC computation result obtained from the data transmitted in the first unit, it means that the base station normally received the first unit transmission data.

The mobile station checks I/B bit to check whether it is allowed to start transmission of the next slot subsequent to collision control bits received by it (step A3). A monitoring time is provided to determine that the movable station was unable to transmit data when the busy (B) state has continued for a certain period of time. A check is made as to whether the monitoring time has been elapsed (step A6). If the monitoring time has not yet been elapsed, the mobile station receives the next slot and analyzes the collision control bits (step A7), and then it checks the I/B bit once again.

When a unit to be transmitted next is present (step A10), this unit is transmitted in the same slot after the lapse of 20 msec. (step A11). When no unit to be transmitted next is present, it means that the transmission is completed.

When it happens in the step A8 or A9 that the first unit data fails to arrive at the base station or the R/N bits represent non-reception (N) in the event of transmission start timing with any other mobile station or PE bits fail to be coincident with the CRC computation result of the data transmitted in the first unit, the first unit is re-transmitted. In the case of the re-transmission, whether the recycle is not over with respect to a prescribed number of cycles is checked (step A12). When the recycle is not over, a random delay time is generated (step A13), and after the lapse of the random delay time control is executed again from the step A2.

The method of calculating the random delay time will now be described. FIG. 6 is a flow chart illustrating the procedure of calculating the random delay time.

As shown in FIG. 6, for the mobile stations currently transmitting or receiving the data to and from the base station the CPU 65 in the mobile station analyzes the data received from the base station in the destination judging unit 64 to take statistics of the result of analysis for each super-frame, and calculates the number of mobile stations including the own station, which the base station transmitted data to (step B2). As an example, the case of transmission at the timings as shown in FIG. 4 will now be taken. In this example, the data is transmitted to seven mobile stations including the own station. The maximum random delay time is determined from the calculated mobile station number as follows (step B3).

(Maximum random delay time) =(number of mobile stations with data transmitted thereto in one super-frame)×10 msec.

Using the above equation, each mobile station further generates a random number in the calculated maximum random delay time, and sets the number in the timer (step B4). The timer value set by generating a random number is started (step B5). When time-out of the timer occurs (step B6), the CPU 65 analyzes the collision control units (I/B) from the de-scrambled received data. When the CPU 65 detects a slot of the transmission allowed (I), it outputs the first unit transmission start instruction to the transmission control unit 61 once again.

Figure 8:
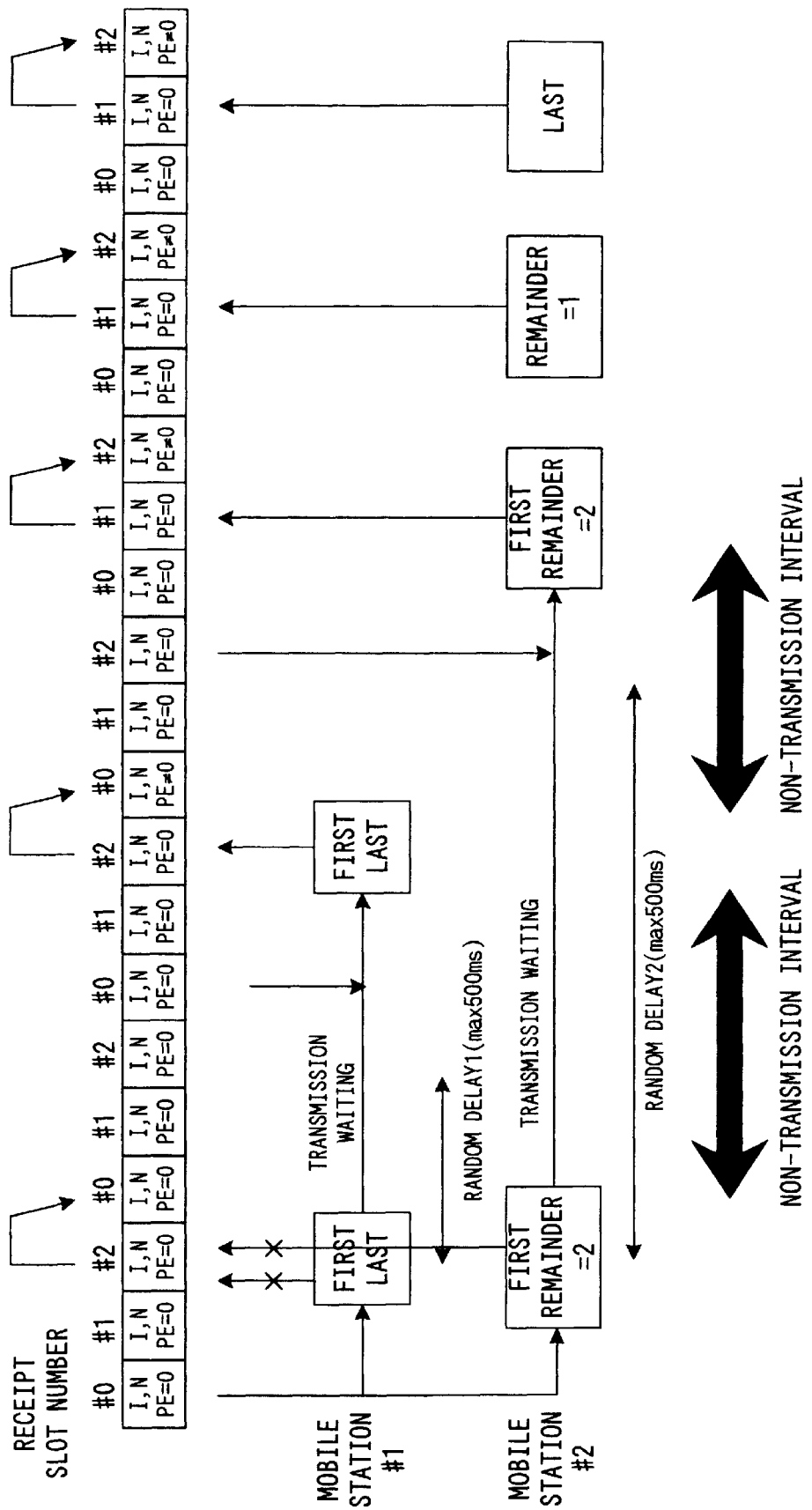
FIG. 8 is a view showing the status of collision of the transmission start timings of two mobile stations in the prior art.
Figure 9:
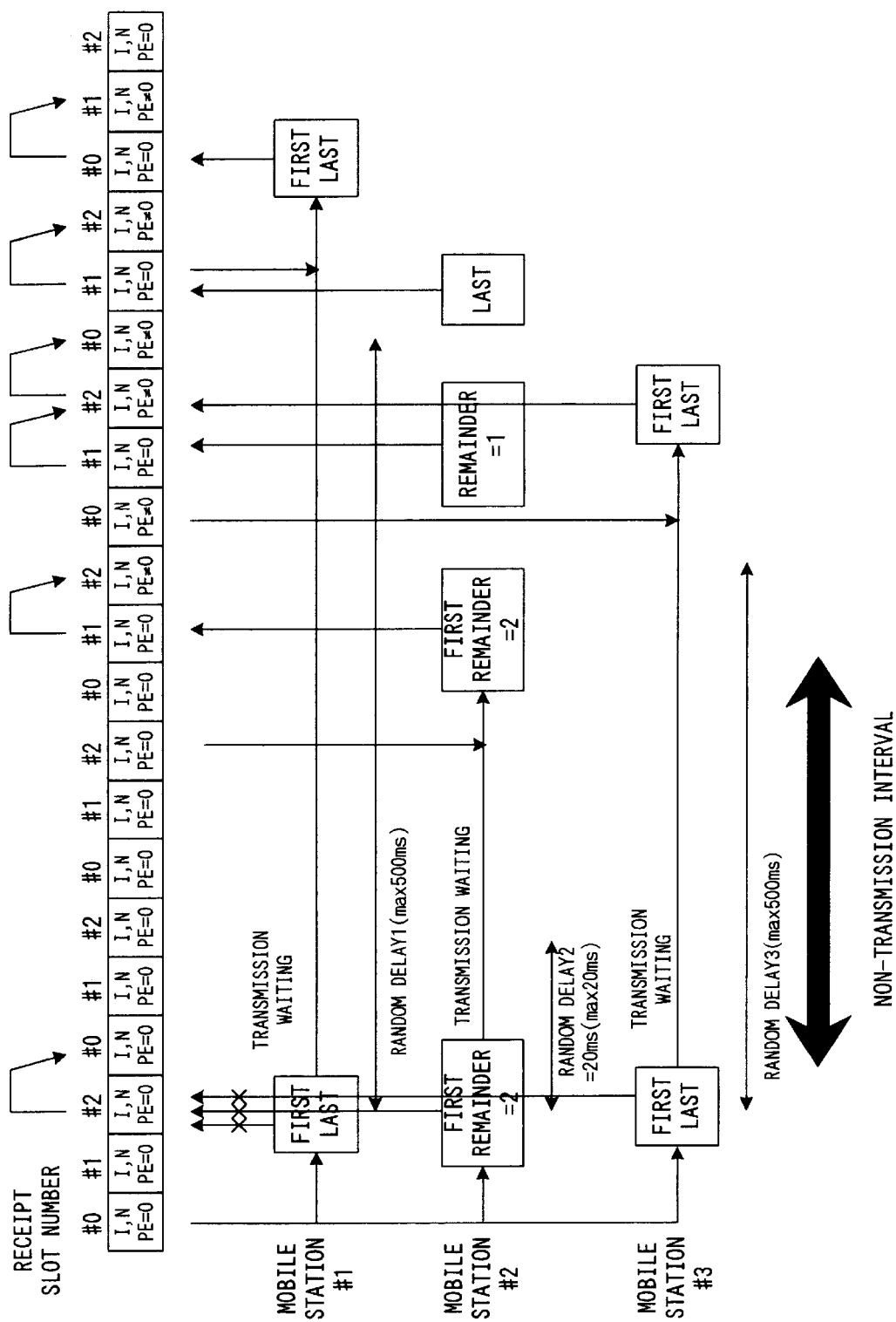
FIG. 9 is a view showing the status of collision of the transmission start timings of three mobile stations in the prior art.

As in the prior art example shown in FIG. 8, when the transmission start timings of two mobile stations #1 and #2 collide with each other, non-transmission time intervals as shown in FIG. 8 are generated until the monitoring of transmission again after the random delay generation. According to the present invention, as seen in FIG. 2, it is possible to suppress the non-transmission time with maximum random delay control by iterally executing the operation as described above.

As has been described in the foregoing, it is possible to suppress the non-transmission time interval as much as possible compared to the interval in the case of the prior art. It is thus possible to make effective use of the radio interval.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. A mobile radio communication system comprising a plurality of mobile stations and a base station, wherein the plurality of mobile stations and the base station randomly transmits and receives data to and from each other, said radio communication system further comprises a radio random access control system in which each mobile station receives all data from the base station, executes an analysis of destination mobile stations of the received data, obtains from the analysis result the number of mobile stations currently transmitting or receiving the data to or from the base station in a radio zone in which the mobile station is present, and calculates a delay time after a transmission timing collision at the time of the start of transmission of the mobile station until the next start of transmission according to the obtained number of mobile stations currently transmitting or receiving the data to or from the base station in the radio zone.

2. The radio random access control system according to claim 1, wherein the maximum value of the calculated delay time is time obtained by multiplying the number of mobile stations with data transmitted thereto by a unit time.

3. A mobile radio communication system comprising a plurality of mobile stations and a base station, wherein the plurality of mobile stations and the base station can randomly transmit and receive data to and from each other, said radio communication system further comprises a radio random access control system, wherein each mobile station comprises:

a transmitting/receiving antenna;

a transmitting circuit for transmitting radio signals to the base station;

a modulating circuit;

a receiving circuit that receives radio communication data from the base station;

a demodulating circuit for converting the received data to binary data; and a controller, wherein the controller executes a de-scrambling analysis of the binary data thus obtained to binary data, executes an analysis of destinations included the data transmitted from the base station, detects the number of destination mobile stations of data received in a certain fixed time interval and calculates the delay time after a transmission timing collision at the time of the start of transmission from the mobile station until the next start of transmission according to the detected number of destination mobile stations.

4. The radio random access control system according to claim 3, wherein the controller comprises:

a signal decoding unit that executes a de-scrambling analysis of the obtained binary data to binary data;

a destination judging unit that analyzes destinations contained in the data received from the base station; and a CPU that detects the number of destination mobile stations contained in the data received in a predetermined time interval, estimates the number of mobile stations in communication with the base station, and calculates delay time after the transmission timing collision at the time of the start of transmission until the next start of transmission according to the detected mobile station number.

5. The radio random access control system according to claim 3, wherein the controller comprises:

a transmission control unit that executes a check, when data to be transmitted is generated, as to whether the base station is above to receive data and causing data transmission to the base station at a prescribed timing when the base station is above to receive data;

a signal coding unit that executes a scrambling process on data to be transmitted from a CPU to the base station in predetermined scrambling codes recognized on the base station side;

a signal decoding unit that executes a de-scrambling process on received signal from the base station in predetermined scrambling codes and transmitting the result to the CPU and a destination judging unit, wherein the destination judging unit judges whether identifier data defined in the data obtained by the de-scrambling process in the signal decoding represents the mobile station or any other station or is a vacant signal and informing the CPU of the judgment result, wherein the CPU estimates the number of mobile stations currently transmitting or receiving data to or from the base station on the basis of data from the destination judging unit and calculates the optimum random delay time from the estimated mobile station number upon collision of the transmission start timing with that of other station at the time of the start of transmission, the transmission control unit being controlled for data transmission to the base station after the lapse of the calculated random delay time.

6. A radio random access control system in a mobile radio communication system comprising a plurality of mobile stations and a base station, wherein the plurality of mobile stations and the base station randomly transmits and receives data to and from each other, wherein a mobile station determines the number of mobile stations currently transmitting or receiving the data to or from the base station in a radio zone in which the mobile station is present on the basis of the received data from the base station, and calculates delay time after a transmission timing collision at the time of the start of transmission from the mobile station until the next start of transmission according to the obtained number of mobile stations currently transmitting or receiving the data to or from the base station in the radio zone.

7. The radio random access control system according to claim 6, wherein the mobile station executes an analysis of destination mobile stations of the received data to obtain the number of mobile stations currently transmitting or receiving the data to or from the base station in the radio zone in which the mobile station is present.

8. The radio random access control system according to claim 6, wherein the maximum value of the calculated delay time is time obtained by multiplying the number of mobile stations with data transmitted thereto by a unit time.

* * * * *